Jan. 18, 1955 W. L. McCANN 2,699,856
OVERLOAD RELEASE CLUTCH
Filed Nov. 16, 1950 2 Sheets-Sheet 2

INVENTOR
WALTER L. McCANN
BY Christopher L. Waal
ATTORNEY

United States Patent Office

2,699,856
Patented Jan. 18, 1955

2,699,856

OVERLOAD RELEASE CLUTCH

Walter L. McCann, West Allis, Wis., assignor to Davis & Thompson Company, West Allis, Wis., a corporation of Delaware Application November 16, 1950, Serial No. 195,996

4 Claims. (Cl. 192—56)

The present invention relates to clutches and more particularly to those of the overload release type.

An object of the invention is to provide a clutch adapted to be engaged and disengaged at intervals and including improved overload release means which will not interfere with normal actuation of the clutch.

Another object is to provide a clutch having overload release means which is rendered ineffective during the clutch-engaging operation.

A further object is to provide an overload release clutch which can be readily actuated to engaged position, even though the driven member, when disengaged, may at times run at a speed higher than that of the driving member.

A still further object is to provide an overload release clutch which will facilitate the use of a power-type clutch actuator, such as a solenoid or the like.

The invention further consists in the several features hereinafter described and claimed.

In the accompanying drawings.

Figure 1:
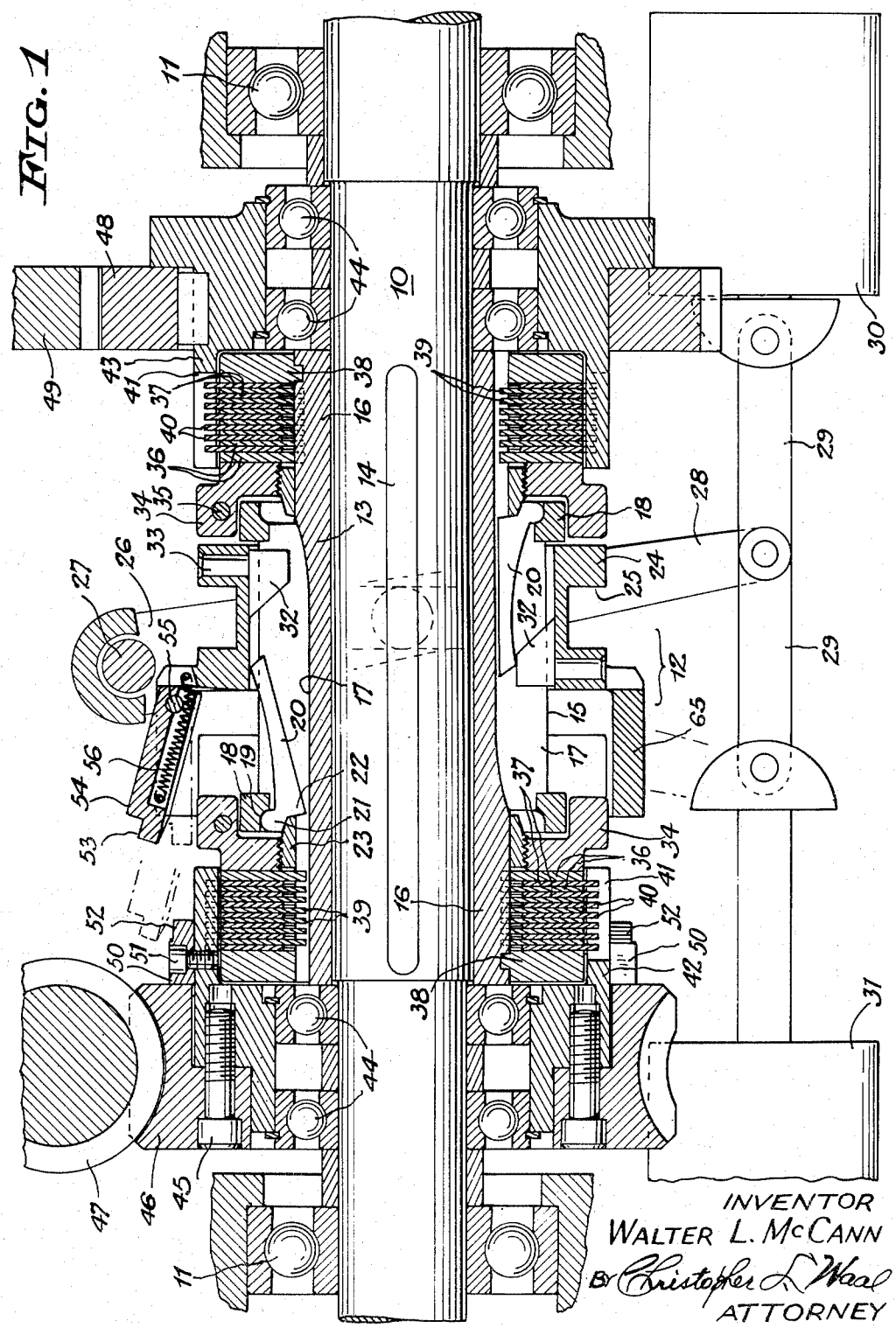
Fig. 1 is a longitudinal sectional view of an overload release clutch of the invention in its high speed position, a centrifugally actuated cam member of the clutch releasing mechanism being shown in different positions in broken lines.

In the drawings, 10 designates a rotatable shaft which is suitably supported, as by axially spaced ball bearings 11, and is driven at selected speeds through a friction clutch mechanism 12 hereinafter described. By way of example, the shaft 10 may be the feed shaft of an automatic drilling machine or other machine tool. In a typical drilling machine, the feed shaft may rotate at several hundred revolutions per minute for rapid traverse of the drill to the work, and may then be driven at a speed ranging downwardly from several revolutions per minute for the cutting travel of the drill. The drill may be retracted from the work in any suitable manner, as by driving the feed shaft in reverse direction.

The clutch mechanism 12 is of a double unit type and is of conventional construction except for overload release means hereinafter described. The clutch mechanism includes a tubular clutch body 13 secured to the driven shaft 10 between the bearings 11, as by a key 14, the clutch body having a cylindrical intermediate portion 15 and reduced cylindrical end portions 16. The clutch body has a plurality of exterior radial grooves or channels 17 some of which extend from one end of the body and along the intermediate portion 15, and others of which extend from the other end of the body and along the intermediate portion. A seating ring 18 is rigidly secured on each end of the intermediate portion of the clutch body and has an annular groove 19. Clutch levers 20 extend longitudinally in the grooves of the clutch body and are disposed in the intermediate portion of this body, there being a set of the clutch levers for each of the two clutch units. Each clutch lever has a rounded toe 21 seated in the groove 19 of the seating ring, and has a heel 22 bearing against a clutch ring 23 slidably mounted on the reduced end portion of the clutch body.

A clutch collar or sleeve 24 rotatable with the clutch body is slidably mounted on the intermediate portion of the clutch body and has an annular groove 25 adapted to receive the pins or rollers of the usual forked actuating lever 26, the upper end of the lever being carried on a suitably supported rock shaft 27. An arm 28 is secured to the rock shaft 27 and is connected at its lower end by links 29 to opposed selectively energized operating solenoids 30 and 31. Actuating cams 32 project from the inner surface of the clutch sleeve 24 into the grooves 17 of the clutch body and are positioned to engage the ends of the clutch levers 20 to rock them on the fulcrums provided by the toes 21 and then to hold these levers in clutch-engaging position. The cams 32, of which there are two sets at opposite ends of the clutch sleeve, are rigidly secured to the sleeve, as by riveted pins 33 formed integrally on the cams, and slidably fit in the clutch body grooves 17.

A pressure adjusting ring 34 is adjustably screwed onto each clutch ring 23 and is secured in adjusted position as by a detent or locking screw 35. A series of alternate clutch disks 36 and 37 surround each cylindrical end portion 16 of the clutch body and are interposed between the pressure adjusting ring 34 and a locking ring or plate 38 carried on the end of the clutch body. Preferably, the clutch disk 36 abutting against the pressure adjusting ring 34 is thicker than the other disks. The clutch disks 36 have inner lugs 39 engaging in the grooves 17 of the clutch body. The clutch disks 37 have outer lugs 40 which are engaged in axially extending grooves 41 formed in respective low-speed and high-speed driving members 42 and 43 of annular shape at opposite ends of the clutch body. The driving members 42 and 43 are rotatably supported on the driven shaft 10 as by ball bearings 44. The low-speed driving member 42 is rigidly secured, as by screws 45, to a worm wheel 46 meshing with a worm 47. The high-speed driving member 43 has keyed thereon a gear 48 meshing with a driving gear 49. The worm 47 and gear 49 are driven in any suitable manner as by a reversible electric motor, not shown. The clutch-operating solenoids 30 and 31 are selectively and momentarily energized at suitable points in the cycle of operation, as by means including switches, not shown.

Figure 2:
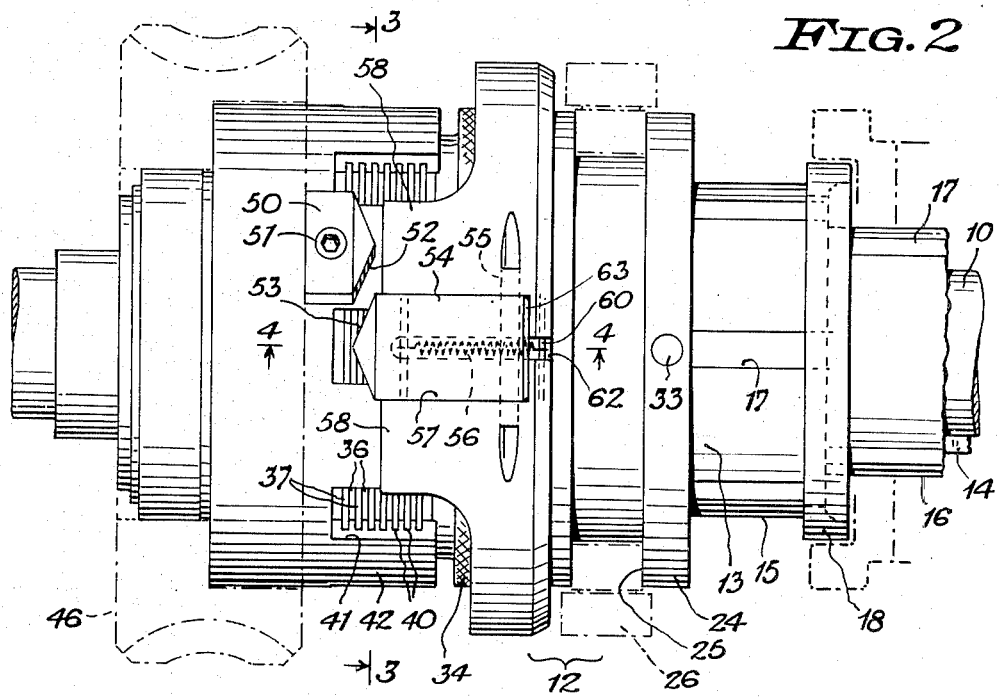
Fig. 2 is a top view of the clutch in its low speed position, parts being broken away.
Figure 3:
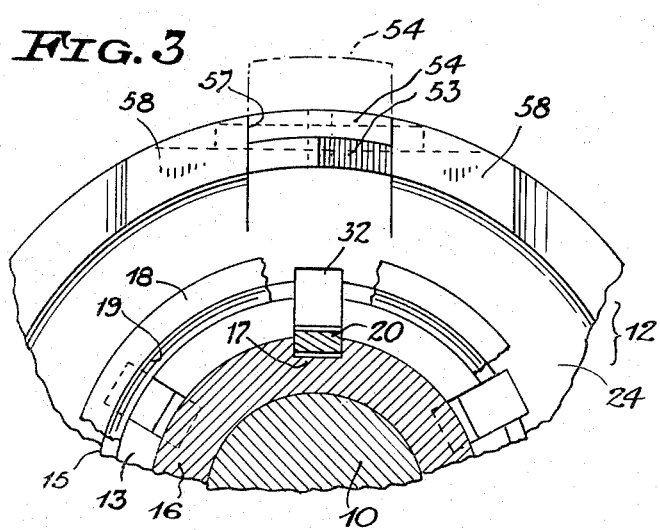
Fig. 3 is a fragmentary detail sectional view taken generally on the line 3—3 of Fig. 2, parts being omitted.
Figure 5:
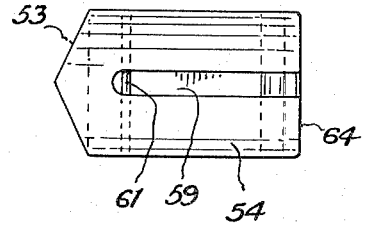
Fig. 5 is a bottom or inside view of a swingable cam member or throwout dog of the clutch.
Figure 4:
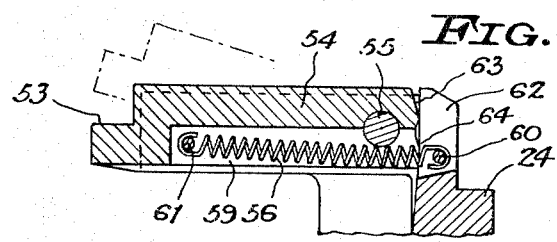
Fig. 4 is a detail sectional view taken generally on the line 4—4 of Fig. 2.

With the construction thus far described, the energization of solenoid 30 will shift the clutch sleeve 24 to the right, as seen in Fig. 1, engaging the clutch disks 36 and 37 of the high-speed clutch unit, so as to drive the feed shaft 10 at a relatively high speed, as for traversing the drill to the work. When the drill approaches its cutting position, the solenoid 31 is momentarily energized, thus shifting the clutch sleeve to the left, as seen in Fig. 2, for disengaging or disconnecting the high-speed clutch unit and engaging the low-speed clutch unit, so as to drive the feed shaft at a suitable low speed for the cutting operation. At the end of the cutting operation, the drill is suitably retracted, as by driving the feed shaft 10 in reverse direction at a suitable speed. Since the clutch levers 20 are held in clutch-engaging position by the cams 32, the actuating solenoids need only be momentarily energized. In its axial travel in either direction between high-speed and low-speed positions, the clutch sleeve 24 passes through an intermediate or neutral zone or position in which both clutch units are disengaged.

The clutching pressure on the disks of the low-speed clutch unit is adjusted to permit slippage if the feed pressure on the drill reaches an abnormally high value. In addition, it is desirable to provide means for releasing or disconnecting the low-speed clutch unit whenever this condition occurs, so as to avoid heating and wear and to warn the operator of the machine. For this purpose, one or more cam members 50 (two being shown) are secured to the low-speed driving member 42, as by screws 51, and each has a cam nose 52 adapted, upon occurrence of an overload and consequent relative rotation or slip between the low-speed driving member and the clutch body 13, to slidably engage a similar cam nose 53 on a cam member or dog 54 secured to the axially shiftable clutch sleeve 24 so as to force the clutch sleeve axially along the clutch body to the neutral zone and thus throw the low-speed clutch unit out of clutching engagement. As seen in Fig. 2, the cam noses of the cooperating cam members will lie in the same relative path of movement only when the low-speed clutch unit is engaged.

According to a feature of the invention, one of the cooperating cam members, preferably the cam member or dog on the clutch sleeve 24, is displaced out of its normal position until the low-speed clutch unit is fully engaged, thus avoiding any danger of abutment of the cam members by axial movement of the clutch sleeve resulting from energization of the low-speed solenoid 31. In this manner, there will be no interference with complete engagement of the low-speed clutch unit. Moreover, in the case of an alternating-current solenoid, the movable member thereof will have its full normal stroke, so as to substantially close the air gap of the magnetic circuit, thus avoiding danger of overheating or burning out of the winding.

The displaceable cam member or dog 54 is here shown to be pivotally mounted on the clutch sleeve by a cross pin 55 and is swingable outwardly under centrifugal force against the action of a coiled tension spring 56, the cross pin being at the end of the cam member remote from the cam nose. The cam member 54 slidably fits in a parallel-sided guide notch or slot 57 formed between ears 58 on the clutch sleeve 24. The spring 56 is housed in a channel 59 formed longitudinally in the underside of the swingable cam member and is anchored at one end on a cross pin 60 secured to the clutch sleeve, and at the other end on a cross pin 61 secured to the cam member. The cross pin 60 extends across a notch 62 formed in the periphery of the clutch sleeve. The spring 56 normally holds the swingable cam member in an active horizontal position which it occupies whenever the rotational speed of the clutch sleeve is below a certain minimum value substantially lower than the high-speed value and slightly above the low-speed value. The pivoted end of the cam member has angularly related stop faces 63 and 64 which are adapted to abut against the inner end face of the guide notch 57 to limit the arcuate travel of the cam member. The clutch sleeve 24 is provided at the side opposite the swingable cam member 54 with a counterbalancing lug 65.

In operation, when the clutch sleeve 24 is axially moved from high-speed position to low-speed position by the solenoid 31 to slow down the feed shaft 10, the centrifugally actuated swingable cam member 54 remains for a time in its outwardly swung position so that during the engagement of the low-speed clutch unit the swingable cam member will be clear of the path of travel of the cam members 50 on the driving member 42, thus avoiding any interference with complete engagement of the low-speed clutch unit. However, as soon as the clutch sleeve 24 slows down sufficiently, as to a few revolutions per minute, the swingable cam member 54 is urged inwardly by the spring 56 to its normal position where it will be effective, in the event of an overload, to cooperate with either of the cam members 50 for releasing or disconnecting the low-speed clutch unit, as hereinbefore described. During the operation of engaging the low-speed clutch unit, the swingable cam member 54 may occasionally fall onto either one of the cam members 50, but will slide therefrom to its active position upon slippage of the clutch unit, if an overload occurs, so as to lie in the path of the other cam member 50. When two diametrically opposite cam members 50 are provided, as shown, an overload on the low-speed clutch unit will release this clutch unit when the driving and driven members thereof have a relative movement of about one-half turn or less. If desired, the maximum clutch-releasing period can be shortened by providing more of the cam members 50.

While the clutch operating devices are preferably of the electromagnetic type, as shown, other power devices, such as fluid pressure devices, may be used. It is also possible to provide for manual operation of the clutch.

What I claim as new and desire to secure by Letters Patent is:

1. In a clutch mechanism, a clutch including rotatable driving and driven friction clutch members for frictionally transmitting normal load but adapted to slip on overload, actuating means for engaging said clutch, and releasing means responsive to overload slippage of said clutch members for disengaging said clutch, said releasing means including cooperating cam parts on said clutch members normally disposed in a common path of travel about the rotational axis of the clutch, one of said cam parts being pivotally mounted on the associated clutch member and swingable out of the path of travel of the other cam part to an inactive position in which said swingable cam part temporarily remains during the operation of engaging the clutch.

2. In a clutch mechanism, a clutch including rotatable driving and driven friction clutch members for frictionally transmitting normal load but adapted to slip on overload, actuating means for engaging said clutch, and releasing means responsive to overload slippage of said clutch members for disengaging said clutch, said releasing means including cooperating cam parts on said clutch members normally disposed in a common path of travel about the rotational axis of the clutch, one of said cam parts being pivotally mounted on the associated clutch member and centrifugally swingable out of the path of travel of the other cam part to an inactive position in which said swingable cam part temporarily remains during the operation of engaging the clutch.

3. In a clutch mechanism, a clutch adapted to be engaged and disengaged and including rotatable driving and driven friction clutch members for frictionally transmitting normal load but adapted to slip on overload, actuating means for engaging and disengaging said clutch including an axially shiftable clutch sleeve, releasing means responsive to relative rotation of said clutch members during overload slipping thereof for axially shifting said sleeve to clutch-disengaging position, said releasing means including relatively rotatable cooperating parts one of which is carried by said clutch sleeve and is in the path of travel of the other part after the clutch is engaged, one of said parts being shiftably mounted for displacement into and out of active position, and means for temporarily holding said shiftably mounted part out of active position during the operation of engaging the clutch, whereby to prevent axial abutment of said cooperating parts during shifting of said clutch sleeve to clutch-engaging position.

4. In a clutch mechanism, a clutch adapted to be engaged and disengaged and including rotatable driving and driven friction clutch members for frictionally transmitting normal load but adapted to slip on overload, actuating means for engaging and disengaging said clutch including an axially shiftable clutch sleeve rotatable with one of said clutch members, a first cam member rotatable with the other clutch member, and a second cam member carried by said clutch sleeve and rotatable therewith, said cam members having a common path of travel when the clutch is engaged and being engageable upon overload slipping of the clutch for axially shifting said clutch sleeve to clutch-disengaging position, one of said cam members being shiftably mounted for temporary radial displacement to an inactive path of travel out of register with the path of travel of the other cam member to prevent axial abutment of said cam members during the operation of engaging the clutch.

References Cited in the file of this patent
UNITED STATES PATENTS

| 1,713,909 | Marchev | May 21, 1929 |
| 2,587,712 | Dodge | Mar. 4, 1952 |